United States Patent
Kannan et al.

(10) Patent No.: US 7,009,182 B2
(45) Date of Patent: Mar. 7, 2006

(54) LOW COST DIGITAL POCKET DOSEMETER

(75) Inventors: Subramaniam Kannan, Mumbai (IN); Keshav Chander Bajaj, Mumbai (IN); Madhuri Dilip Lalsare, Mumbai (IN)

(73) Assignee: Department of Atomic Energy, Government of India, Mumbai (IN)

( * ) Notice: Subject to any disclaimer, the term of this patent is extended or adjusted under 35 U.S.C. 154(b) by 186 days.

(21) Appl. No.: 10/476,258

(22) PCT Filed: Sep. 7, 2001

(86) PCT No.: PCT/IN01/00154

§ 371 (c)(1),
(2), (4) Date: Oct. 27, 2003

(87) PCT Pub. No.: WO02/093194

PCT Pub. Date: Nov. 21, 2002

(65) Prior Publication Data

US 2004/0129888 A1    Jul. 8, 2004

(30) Foreign Application Priority Data

May 14, 2001  (IN) ..................... 454/MUM/2001

(51) Int. Cl.
*G01T 1/02*      (2006.01)
(52) U.S. Cl. ..................... 250/370.07; 250/370.09
(58) Field of Classification Search ........... 250/370.05, 250/370.07, 370.09, 370.14, 252.1, 388
See application file for complete search history.

(56) References Cited

U.S. PATENT DOCUMENTS 4,461,952 A * 7/1984 Allemand et al. ...... 250/370.07
4,608,655 A * 8/1986 Wolf et al. .................. 702/176

(Continued)

FOREIGN PATENT DOCUMENTS

GB      2 255 177      10/1992

OTHER PUBLICATIONS

Wernli, C. and Jones, A. R.: "The Development of a Simple High Range Skin Dose Rarte Meter Using Silicon Diode as a Detector", Health Pysics, vol. 41, No. 2, Aug. 1981, pp. 371-378, XP002197586.

(Continued)

*Primary Examiner*—David Porta
*Assistant Examiner*—Faye Polyzos
(74) *Attorney, Agent, or Firm*—Merchant & Gould P.C.

(57) ABSTRACT

The invention relates to a pocket type digital radiation dosemeter comprising of a detector, which converts the ionisation in the detector caused by the incidence of ionising radiation of certain energy range into electrical impulses, a low power pulse amplifier, that amplifies the electrical pulses from the detector to detectable amplitudes, a discriminator circuit, that is used to reject pulses of origin other than those caused by the ionising radiation, a programmable divider circuit for calibrating the dosemeter, an electronic counting circuit and a six digit LCD display. The sensitivity of the dosemeter is 1 count per $\mu$Sv (micro Sievert) and the accuracy is within ±15% from 60 keV to 1.25 Mev of X or Gamma radiation. A metallic energy compensation filter and a discriminator threshold modulation circuit are used to provide uniform response within ±15% from 60 KeV to 1.25 MeV. The Digital display indicates at any instant the total X or Gamma radiation dose, in $\mu$Sv, received by the dosemeter since the time at which the dosemeter was switched on. The dosemeter is designed for very low power consumption and is powered by two coin type Li batteries (Type CR2320). It is capable of over 500 hours of continuous operation before having to replace the batteries. A blinking LED indicates low battery condition when 8 hours of battery life is still left. The entire circuitry and the battery holder are mounted on a single printed circuit board. Surface mount components are used to make the unit compact. The dosemeter is compact (110 mm L×30 mm W×14 mm H excluding Clip) and light in weight (60 gm).

13 Claims, 4 Drawing Sheets

U.S. PATENT DOCUMENTS

| | | | | |
|---|---|---|---|---|
| 4,857,739 | A | * | 8/1989 | Phelps ........................ 250/388 |
| 4,879,466 | A | * | 11/1989 | Kitaguchi et al. ..... 250/370.14 |
| 4,996,429 | A | * | 2/1991 | Gunter .................... 250/336.1 |
| 5,132,543 | A | | 7/1992 | Valentine et al. |
| 6,388,250 | B1 | * | 5/2002 | Croydon et al. ......... 250/252.1 |
| 6,696,868 | B1 | * | 2/2004 | Gardner ...................... 327/102 |
| 6,765,214 | B1 | * | 7/2004 | Kosslow et al. ............ 250/376 |

OTHER PUBLICATIONS

Sankaran A. et al., "Microprocessor-based Diagnostic X-Ray Beam Quality Assurance Dosimeter Using a Photovoltaic Detector/Amplifier Device", International Journal of Radiation Application and Instrumentation Part A: Applied Radiation and Isotopes, Pergamon Press Ltd., Exeter, GB, vol., 42, No. 1, 1991, pp. 31-39, XP000177395.

* cited by examiner

LOW COST DIGITAL POCKET DOSEMETER

FIELD OF INVENTION

This invention relates to active, compact, pocket-type devices used for monitoring the cumulative radiation dose received by persons working in X & Gamma radiation environments. This invention relates particularly to such devices commonly known as personnel monitoring radiation dosemeters and more particularly to dosemeters incorporating solid state semiconductor detectors.

BACKGROUND AND PRIOR ART

Personal monitoring is invariably carried out using passive dosemeters incorporating either photographic film or thermoluminescent dosemeters. However these dosemeters are being supplemented by electronic devices for use as a warning device in high dose rate areas. The electronic dosemeters usually incorporate either a miniature GM counter or a solid state semiconductor detector and are designed to measure deep dose equivalent for photons in the range of 60 KeV to 1.25 MeV. The integrated dose is digitally displayed and in some of the pocket dosemeters visual/oral preset dose alarm is also provided. Microprocessor based versions of electronic dosemeters are also commercially available with sophisticated data acquisition and storage capabilities. (See Delacroix, D., Guelin, M., Lyron, C. and Feraud, J. P. "Dosicard: on-site evaluation of a new individual dosimetry system", Radiat. Prot. Dosim. 58(3), 193–199(1995). And Toshikazu, Yoshiyuki Nagase, Takeshi Ishikura, Eisuke Okamoto, and Yoshiteru Yoshida, "A high reliability Personal Alarm Dosemeter with a semiconductor detector", Fuji Electric Co. Ltd., Tokyo 191, Japan).

U.S. Pat. No. 4,996,429 (1991) describes an instrument for measuring ionization radiation acting upon a person. It can be carried in the pocket of a garment. It has a radiation detector exposed to a wide angle of ionizing radiation and a display unit showing the radiation received by the instrument. The instrument operates on rechargeable battery, has high power consumption and is bulky.

U.S. Pat. No. 4,430,569 (1984) describes a pocket type radiation dosemeter and a charging circuit for recharging the battery used for its operation. It is a compact, light-weight, usable by the layman, but the dosemeter proper is of conventional design at that time. The charging circuit includes a shake-type electrostatic generator, a voltage doubler for integrating generator output voltage of one polarity, and a switch operated by external permanent magnet. This type of dosemeter is based on an ion chamber radiation detector and a quartz fibre electrometer. The dosemeter is read by observing the position of a quartz fibre over a nonlinear scale through an eye piece. However, it has poor resolution (>10 $\mu$Sv), limited range and it is highly susceptible to vibration, shock and humidity. Further it has no easy-to-read digital display.

U.S. Pat. No. 4,857,739(1989) describes pocket personal radiation monitor of the "chirper" type. A battery powered high voltage power supply is used to generate and apply a high voltage bias to a G-M tube radiation sensor. The high voltage is monitored by a low-loss sensing network which generates a feedback signal to control the high voltage power supply such that the high voltage bias is recharged to +500 VDC when the current pulses of the sensor, generated by the detection of ionizing radiation events, discharges the high voltage bias to +450 VDC. During the high voltage recharge period an audio transducer is activated to produce an audible "chirp". The rate of the "chirps" is controlled by rate at which the high voltage bias is recharged, which is proportional to the radiation field intensity to which the sensor is exposed. The "chirp" rate sensitivity is set to be approximately 1.5 (chirps/Min/mR/hr). The G-M tube sensor is used in a current sensing mode so that the device does not paralyze in a high radiation field. This instrument, uses GM counter as detector, which can provide only a qualitative indication of the radiation dose through chirps, no digital display of accumulated dose, not of pen-type, has higher power consumption and is bulky.

U.S. Pat. No. 5,132,543 (1992) describes an electronic pocket dosimeter based on a GM tube sensor. U.S. Pat. No. 4,608,655 (1986) describes a wrist watch dosimeter based on an expensive CdTe (Cadmium Telluride) radiation sensor.

U.S. Pat. No. 5,567,946 (1996) describes a pocket dosemeter but it is not of digital type.

EP 0581422 (1994) relates to a Particle Dosimeter comprising of diodes for measurement of equivalent radiation dose due to neutrons, protons, electrons and photons and hence not relevant to the current invention.

With the wide spread use of radio isotopes for a number of applications and the rapid growth of atomic energy programmes world wide, there has been a need for an accurate and low cost pocket type dosemeter provided with a convenient readout device. There are a number of such dosemeters commercially available. These dosemeters use Geiger-Mueller (GM) counters or specially fabricated P-I-N Si semiconductors as the detector and some ASIC (Application Specific Integrated Circuit) for processing the radiation induced signal from the detector and are generally expensive. The object of this invention is to develop a low cost pocket dosemeter using readily available components including the detector.

There are different types of dosemeters presently in the field. Each of these is having certain unique features. Some of these are:

(i) Geiger-Mueller (GM) counters or specially fabricated P-I-N Si semiconductor diodes as the detector and some ASIC (Application Specific Integrated Circuit) for processing the radiation induced signal from the detector and are generally expensive.
(ii) Use of low capacitance type planar diffusion type Si photodiodes or Si heterojunction diodes.
(iii) Use of reverse bias of several tens of volts for the detector to get sufficient sensitivity.
(iv) Use of elaborate zero suppression circuits to achieve acceptable background level counts.
(v) Usable up to a maximum radiation dose rate of 0.5 Sv/h. (Sv is an unit of radiation dose equivalent).

Some models in the market relevant to the dosemeter of the present invention are:

(a) (Electronics Corporation of India Ltd.) ECIL make pocket dosemeter model PD 4506 uses GM Tube as detector, has a sensitivity of 10 $\mu$Sv per count (against the current claim of 1 $\mu$Sv per count), bulky (160 mm×65 mm×25 mm), heavy (160 gms) and maximum dose range of only 10 mSv (against the current claim of >1 Sv). (See "Digital Dosimetry System", Electronics Corporation of India Ltd. ECIL P.O., Hyderabad, 500762).
(b) Pulsecho Systems Pvt. Ltd., Model "Dosirad" is GM tube radiation detector based, bulky (125 mm×50 mm×25 mm) and heavy (175 gm). ("Dosirad", Pulsecho Systems (Bombay) Pvt.Ltd., Unit 110, Nirmal Industrial Estate, Near Sion Fort, Sion(E), Bombay 400 022.)
(c) PLA Electro Appliances Pvt. Ltd., Models PDM 103 & PDM 221L are GM tube radiation detector based, dose range of up to 100 mSv only, bulky (120 mm×65 mm×23 mm) and heavy. ("Pocket Dosemeter" models PDM 221L & PDM 103, PLA Electro Appliances Pvt.Ltd., Thakor Estate, Kurla Kirol Road, Vidyavihar (W), Mumbai 400 086).

(d) "Personal Digital Dosemeter, Model 885"; Victoreen, Inc. (Cleveland, Ohio, 1989)

(e) "Alarm Pocket Dosemeter (APD)", Panasonic, Matsushita Electric Trading Co., Ltd. (Osaka, Japan)

(f) Personal Electronic Dosimeter DMC 2000 XB, etc., MGP Instruments Inc., 5000 Highlands Parkway, Suite 150, Smyrna, Georgia 30082.

(g) Electronic Pocket Dosimeter, MyDOSE mini, Model PDM-102, Aloka Co. Ltd., 6-22-1, Mure, Mitaka-shi, Tokyo, 181–8622, Japan.

Drawbacks of the Prior Art:

The main drawback of the prior art is that the dosemeters presently available in the market are very expensive as they make use of expensive radiation detectors and ASICs/microprocessors. All the prior art types with digital display respond to X and Gamma rays in the energy range of 60 keV to 1.25 Mev within ±25% to ±30%; ideally an uniform response for the entire energy range is desired.

The prior art types have limited linearity beyond a certain dose rate though linearity up to much higher dose rate levels is desirable for some applications.

Most of the pocket dosemeters are heavy to carry them on the person throughout days in and out. Another drawback is that the size of some of these pocket dosemeters is not so convenient to keep them on person in the normal dress pocket.

Some of the dosemeters have high power consumption requiring either bulky batteries to provide continuous operation for at least 300 hours or rechargeable batteries to facilitate 12–24 hour continuous operation requiring over night external charging of batteries.

Object:

The principal object of the invention is to make a dosemeter, which will have an uniform response for X and Gamma rays in the energy range of 60 keV to 1.25 Mev within ±15%, for personal use; to develop a dosemeter which is inexpensive, small in size, light in weight and convenient to wear.

Another object of the invention is to make it appropriately sensitive to low levels of radiation and at the same time respond linearly to high radiation exposure rates, which may be encountered in an accident situation.

SUMMARY OF THE INVENTION

Accordingly the present invention relates to a low cost, digital pocket dosemeter for measurement of radiation dose from ionising X and Gamma radiation of energy greater than 60 KeV comprising i) means for converting said ionising radiation into electrical impulses;

ii) means for amplifying said electrical impulses at low voltage and power consumption less than a 0.4 mW;

iii) means to reject unwanted electrical noise impulses from said electrical impulses;

iv) means to achieve a calibration of one impulse per $\mu$Sv;

v) means to achieve an uniform response for X and Gamma rays in the energy range of 60 keV to 1.25 Mev within ±15%;

vi) means to achieve linear response up to a dose rate 5 Sv/h;

vii) means to count said unrejected impulses;

viii) means to display said count cumulatively; and ix) a compact power source.

DESCRIPTION OF THE PREFERRED EMBODIMENT OF THE INVENTION

The dosemeter of the present invention comprises: a) means to detect ionising radiation in the form of electric charge pulses; b) amplifier to amplify these electrical pulses c) means to discriminate (a discriminator) and filter out noise or extraneous pulses which do not originate from ambient X & gamma radiation; d) means for counting and displaying the cumulative exposure, and e) means for warning battery replacement when due, all these parts are made of light weight and low volume, inexpensive components and all assembled in a tube of rectangular cross section suitable for keeping in a personal pocket.

Some of the characteristic features of the invention are described below:

a) As a means to detect ionising radiation in the form of electric charge pulses, a low cost commercially available Silicon p-n junction, high voltage rectifier diode having sensitivity to X or gamma radiation in the energy range of 60 KeV to 1.25 MeV is employed as a radiation detector. This Si diode is readily available for use as a high voltage rectifier in electronic circuits.

In the prior art types of dosemeters, use of specially fabricated, and hence expensive, p-n junction device as a radiation detector or GM tube as a radiation detector has been described. GM tube radiation detector is usually a gas-filled glass or metallic tube, which operates at a high voltage of 450V or more and converts the ionization in the detector caused by the incidence of ionizing radiation into electrical pulses.

b) A circuit has been designed for operation of Si diode detector at a low reverse bias of 4V±0.2V to achieve a low power, low noise & stable operation. Further features of this circuit are:

A regulated voltage source of 4V using a commercially available low drop-out linear regulator is useful for applying a stable reverse bias (the anode is given a negative potential with respect to cathode) to the said detector. This regulator is an electronic circuit that produces a constant output voltage as long as the input voltage is at least a few mV (typically 50 mV) greater than the output voltage.

The direct advantage of this feature is in low power consumption and low noise operation. Thus there is a reduction in power consumption due to the absence of power consuming & noisy step up DC-DC converter, which is required in the prior art instruments wherein a higher voltage reverse bias has to be applied to the detector. All relevant prior art types use reverse bias of several tens of volts for the detector to get sufficient sensitivity by using a DC-DC converter or extra batteries. Another advantage of this feature of the present invention is its stable operation; offers the stability of the characteristics of the various circuit elements due to the constancy of the applied supply voltage obtained using the voltage regulator.

c) A low cost CMOS (Complementary Metal Oxide Semiconductor) charge sensitive pulse amplifier operating at 4V with a power consumption of less than 0.4 mW is used as a means to amplify the said electrical impulses. A charge sensitive pulse amplifier electronic circuit amplifies the total charge content of the pulse at the input of the amplifier to higher amplitude pulses at the output by a fixed factor called gain of the amplifier. The gain is adjusted in such a way that the instrument is sensitive to low energy radiation (>60 keV) and at same time the noise pulses (pulses present at the output of the amplifier caused by sources other than X & Gamma radiation exposure) at the output of the amplifier are of lower amplitude compared to the amplitude of the pulses caused by exposure to low energy radiation. Further, the power consumption is very low because a CMOS inverter is adapted as amplifier.

d) A simple, low power discriminator circuit to reject unwanted electrical noise pulses from the detector.

This discriminator electronic circuit responds to electrical (voltage) pulses of amplitude greater than a set threshold (that can be adjusted) voltage of the discriminator, and shapes these pulses into pulses of constant amplitude at the output. This circuit eliminates background counts by cutting off the noise pulses, which form part of the amplified pulses from the detector, which are caused by the factors other than the ionising radiation of interest. The instruments of prior art types use elaborate zero suppression circuits to achieve acceptable background level counts.

e) The radiation detector along with an amplifier of required characteristics as described in 'c', is enclosed in a energy compensation filter box of 0.8 mm thick copper; the box also shields the sensitive detector/amplifier circuit from stray electro-megnetic fields.

The detector material (Silicon) has a natural high response at low energy range of less than 100 KeV of X and gamma radiation. The 0.8 mm copper filter provides the necessary attenuation of the incident radiation to compensate for the high response in this range. As the detector is used in the pulse mode, low as well as high energy photons (particles of characteristic energy that constitute the said radiation) are given the same weightage. As the measured quantity (Sievert) is proportional to the total energy absorbed, this constant weightage pulse counting results in a continuously decreasing response from low to high energy. As this can not be compensated by mechanical attenuation methods, a simple electronic compensation circuit is used. In this circuit, the discriminator threshold above the noise discrimination level is modulated by a periodic (500 Hz) waveform approximating a linear ramp from a few mV above the noise rejection threshold of the detector to 1000 mV in such a way that the pulses of lower energies are passed through the discriminator for a progressively decreasing fraction of time during every period of the waveform.

An uniform response for X and Gamma rays in the energy range of 60 keV to 1.25 Mev within ±15% is thus achieved.

f) The Dosemeter has an usable radiation dose rate range from 1 $\mu$Sv/h to 5 Sv/h.

The dosemeter responds linearly to radiation dose rates, at which the radiation is received, up to the specified range within ±20%.

In the instruments of the prior art this usable radiation dose rate range is from 1 $\mu$Sv/h to 0.5 Sv/h or less with the specified accuracy.

g) The dosemeter is made from readily available conventional electronic components such as CMOS integrated circuits CD4024, MAX 972, MAX8864, etc.

These components are commercially available for use in a number of electronic circuit applications. This aspect is important from the point of view of reducing the cost of the invention. Instruments of the prior art types of comparable size use expensive ASIC (Application Specific Integrated Circuit) exclusively designed for processing the radiation induced signal from the detector.

A programmable divider circuit using binary divider CD 4024 to divide the pulses from the output of the discriminator to achieve a calibration of one pulse per $\mu$Sv. (1 $\mu$Sv=one millionth fraction of the unit Sv). This is an electronic circuit that accepts at the input pulses of repetition rate 'f' and produces output pulses of repetition rate f/N where N is an integer variable. 'N' is variable from 1 to 31 using a 5 way DIP (Dual-Inline-Package) switch.

An electronic radiation dose counter module with a seven segment, 6-digit, LCD display device to store and indicate up to 999999 $\mu$Sv of integral radiation dose. This counter is a digital electronic circuit that counts each pulse of pre-defined height & width at its input corresponding to one unit (1 $\mu$Sv) of radiation dose.

h) In another embodiment of the invention, there is provided a battery low indication/warning through a LED (Light emitting Diode). In another embodiment, the LED blinks when battery voltage is low. The blinking frequency indicates the state of the battery. Blinking starts at a low frequency of one flash per 4 seconds, when approximately 8 hours of battery life is still available.

i) Achievement of a small Printed Circuit Board consisting of all the necessary circuit components in surface mount package comparable in size to the prior art types with expensive ASIC of thickness 0.8 mm width 25 mm and length 80 mm The PCB is housed in a rectangular Aluminium tube of length 73 mm, height 12 mm and width 30 mm, with the two ends closed with plastic caps as shown in FIG. 2 j) Small size & weight (Size: 110 mm L×30 mm W×14 mm H excluding Clip, Weight: 60 gm).

k) Lowcost: $ 100/.

EXAMPLE

Fabrication of a Prototype is Described Below:

The invention will now be illustrated by a prototype fabricated. The detailed description, specifications, features and drawings (FIGS. 1–6) of the prototype given below are by way of illustration only and do not restrict the scope of the invention.

A prototype of the instrument having all the features of the present invention has been achieved. The construction of prototype has been described in the drawings 1–6 and its specifications are given below A small Printed Circuit Board consisting of all the necessary circuit components in surface mount package comparable in size to the prior art types with expensive ASIC. It is a single printed circuit board of thickness 0.8 mm width 25 mm and length 80 mm containing the entire electronic circuitry.

ii) A two part chrome plated battery clamp soldered to one end of the PCB and held in place by a plastic holder to house two numbers of coin type Li battery CR2320.

iii) The PCB is housed in a rectangular Aluminium tube of length 73 mm, height 14 mm and width 30 mm, with the two ends closed with plastic caps as shown in FIG. 2 iv) A specially designed plastic clip fixed to rear side of the Aluminium tube capable of holding the weight of the instrument.

v) This prototype has small size & weight (Size: 110 mm L×30 mm W×14 mm H excluding Clip, Weight: 60 gm).

vi) The comparative cost of this instrument would be about $100/-, when the equivalent prior art instrument would cost more than $200/-.

Specifications of the Prototype are as Follows:

| | |
|---|---|
| Radiation detected: | X & Gamma radiation (>40 KeV) |
| Detector used: | PN junction Si semiconductor |
| Range of measurement: | 1 μSv to 99999 μSv. |
| Energy dependence: | Within ± 15% from 60 KeV to 1.25 Mev |
| Readout accuracy: | Within ± 15% for $^{137}$Cs, up to 0.5 Sv/h |
| Dose rate range: | Within ± 10% (0.5 Sv/h) |
| | Within ± 20% (5 Sv /h) |
| Operating Environment: | 0–45° C.; 90% RH (non-condensing) |
| Battery: | Coin type Lithium Battery (CR 2320 × 2) |
| Battery Life: | Continuous use of 300 hr. (Approximate) |
| Sensitivity: | One count per μSv |
| Display: | 6 Digit LCD |
| Dimensions: | 30 (W) × 110 (L) × 14 (D) mm (Excluding the Clip) |
| Weight: | Approximately 60 gm. |
| Over flow Indication: | Indicated by the sixth digit. |
| Low Battery Indication: | Battery Low LED blinks when battery is low. Blinking frequency is indicative of battery state. Blinking starts at a low frequency of 0.2 pps, when 8 hr. (approximate) of battery life is still available. When blinking frequency is approximately 1 pps or more, the dosemeter reading is not reliable. |

BRIEF DESCRIPTION OF THE DRAWINGS

The invention will now be illustrated with the help of drawings of the prototype in respect of a dosemeter according to the present invention. The drawings are for illustration only and in no way restrict the scope of the present invention.

Figure 1:
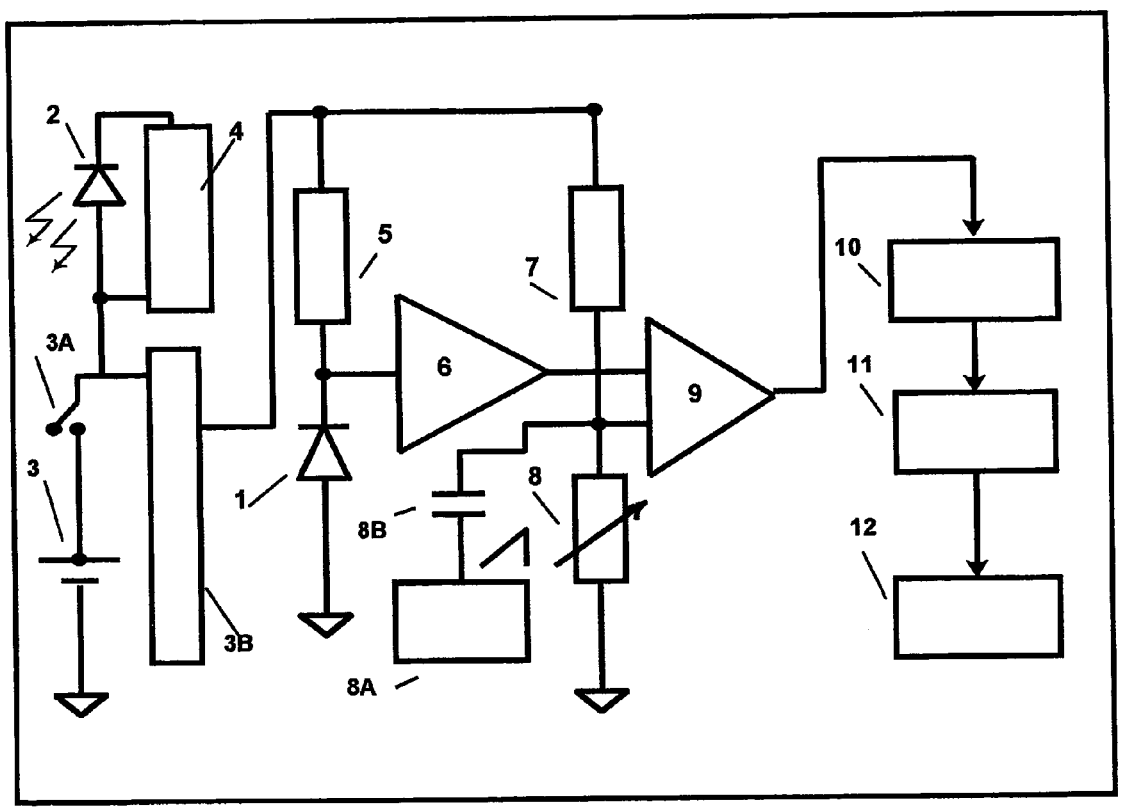
FIG. 1: Block Diagram of a dosemeter of the present invention

In this invention namely the digital pocket radiation dosemeter, a detector 1 is used to convert the ionising radiation into electrical signals in the form of voltage or charge pulses. These pulses are amplified by a pulse amplifier 6 to acceptable levels, which would permit further processing of these pulses. An electronic device called discriminator 9 is used to reject that part of the amplified pulses from the detector which are caused by factors other than ionizing radiation of interest. The pulses, after discrimination, are divided by a programmable electronic divider 10 and fed to an electronic radiation dose counter 11. The divider is programmed in such a way that one count in the radiation counter corresponds to 1 μSv. A display device 12 connected to the dose radiation counter is used to indicate the instantaneous value of the integral dose stored in the radiation counter.

The present invention as well as the objects, features and advantages thereof can be more fully understood from the following detailed description of the product in conjunction with the drawings in which FIG. 1 Block Diagram of a Dosemeter:

This is the block diagram of the digital pocket dosemeter embodying the invention. A radiation dose of 1 μSV corresponds to approximately 20 pulses delivered by the detector 1 over and above the electrical noise pulses. The detector is applied a reverse bias (The detector has two electrodes, anode & Cathode. Reverse bias means that anode is given a negative potential with respect to cathode) through resistor 5. The pulses from the detector are amplified by the pulse amplifier 6 and are fed to a discriminator 9. The discriminator passes to its output only those pulses of height more than the threshold voltage applied to it. The threshold voltage adjusted through resistor 7 and potentiometer 8, to cut off the noise pulses. A waveform generator circuit 8A produces an approximately linear ramp of height 1V at a repetition rate of 500 Hz. The ramp is superimposed on the discriminator threshold voltage through capacitor 8B. The pulses at the output of the discriminator are fed to a programmable divider 10. The programmable divider can be adjusted so as to produce one pulse at the output for every 20 pulses at the input so that 1 count corresponds to 1 μSv at the output of the programmable divider. These pulses are then fed to a 6-digit electronic counter 11 which is incremented by every pulse and the total number of pulses received by the counter up to any instant of time remains stored in the counter. The contents of the counter are displayed by the display device 12, which is a seven-segment, 6 digit LCD display. The entire circuitry is powered by a 6V Lithium battery 3. The battery voltage is regulated to 4V by a voltage regulator 3B and applied to the circuitry. The condition of the battery is monitored by a battery low indicator circuit 4. When the battery voltage falls below the acceptable limit LED 2 starts flashing. The switch 3A provides the means of switching the dosemeter 'On' and 'Off'.

The detector-amplifier portion of the PCB is provided with an energy compensation filter which also doubles as an electromagnetic shield and potted using a polyurethane potting compound to protect against malfunctioning of the circuitry due to vibrations. The power consumption of the dosemeter is about 0.3 mA when subjected to radiation field of 1 mSv/h. The entire circuit is based on surface mount components to make the instrument compact. The size of the instrument is 110 mm L×30 mm W×14 mm H.

Figure 2:
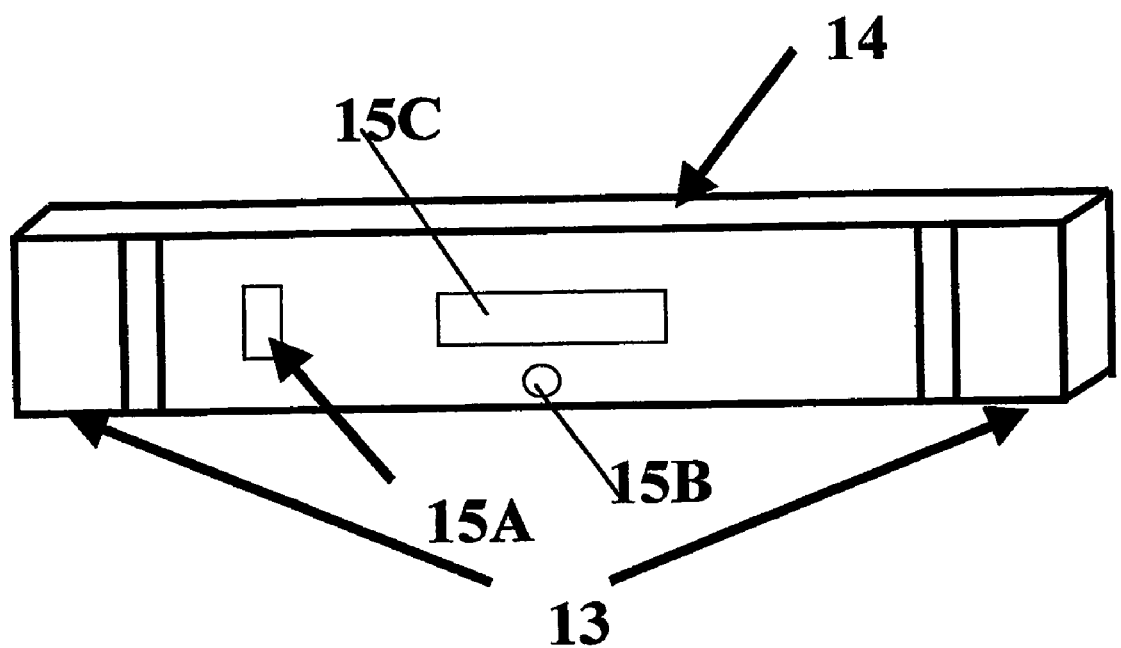
FIG. 2: A diagram of the dosemeter described in FIG. 1.

FIG. 2: A Diagram of the Dosemeter Described in FIG. 1

This shows a complete pocket dosemeter according to the present invention. The dosemeter circuitry is enclosed in a powder-coated rectangular aluminium tube 14 fitted with plastic caps 13 on both sides. The dosemeter is provided with an On-Off Switch 15A for switching off the unit when not in use, low battery indicator 15B and display 15C.

Figure 3:
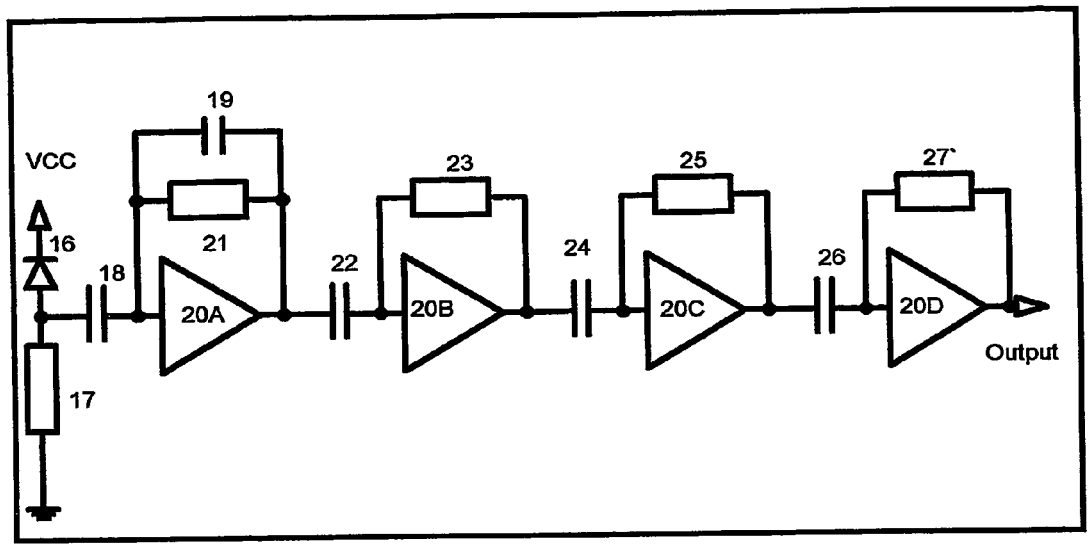
FIG. 3: Diagram of detector-amplifier module of the dosemeter described in FIG. 1

FIG. 3: Diagram of Detector-Amplifier Module of the Dosemeter Described in FIG. 1

This is the detector and amplifier part of the circuitry. The detector 16 is reverse biased by connecting the cathode to VCC (a regulated voltage obtained using a voltage regulator described in FIG. 1) and the anode to circuit common through resistor 17. The pulses from the detector are fed to the charge-sensitive pulse amplifier comprising of CMOS amplifier 20A, input capacitor 18, feed back capacitor 19 and resistor 21. The pulses are amplified by three more stages of amplifiers comprising of resistors 21, 23, 25 & 27 and CMOS amplifiers 20B, 20C & 20D.

Figure 4:
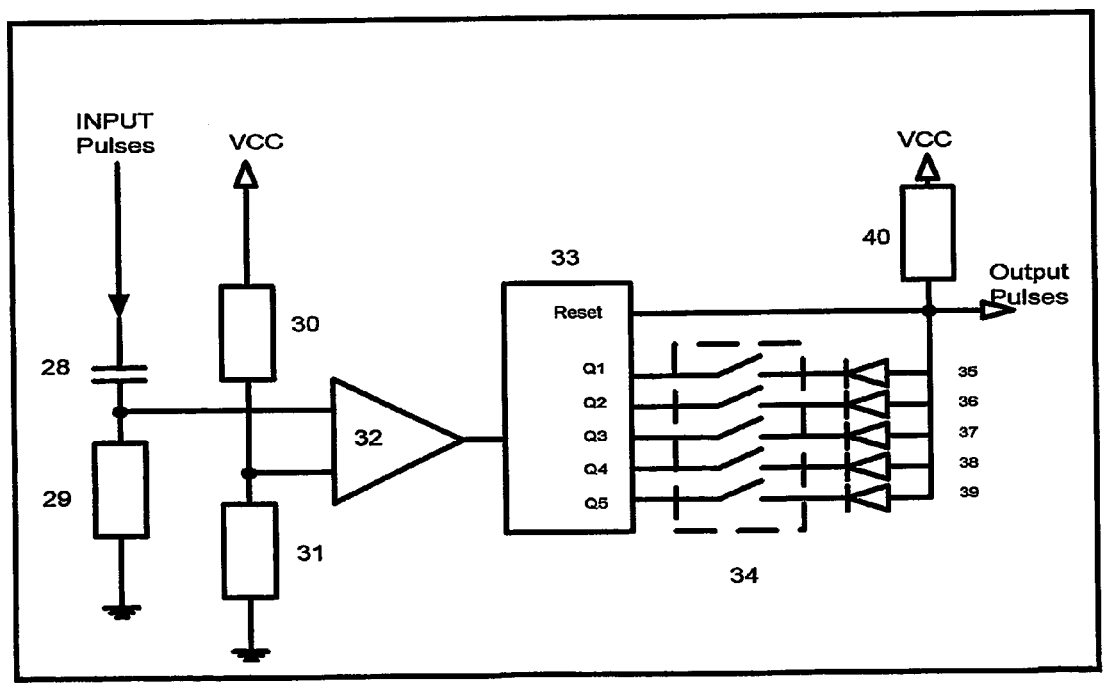
FIG. 4: Diagram of discriminator and programmable divider described in FIG. 1

FIG. 4: Diagram of Discriminator and Programmable Divider of the Counter of the Dosemeter Described in FIG. 1

FIG. 4 is the discriminator and programmable divider part of the circuit. The pulses from the amplifier output are fed to the discriminator comprising of comparator 32 (MAX 972) through capacitor 28 & resistor 29. The network of resistors 30 and 31 provide the threshold for the discriminator. The threshold is adjusted using the variable resistor (potentiometer) 31. The pulses from the output of the discriminator are fed to the programmable divider comprising of CMOS 8 bit binary counter CD 4024, 33, DIP switch 34, diodes 35, 36, 37, 38 & 39 and resistors 40. The diodes 35 to 39 along with resistor 40 constitute a five-input "AND" gate. The inputs of this AND gate can be selectively connected to the first five binary outputs of the counter 33 through the DIP switch 33. The AND gate output is connected to the reset input of the binary divider. Thus by selecting the DIP switch positions any combination of the five outputs Q1 to Q5 can be connected to the AND gate inputs resulting in resetting of the counter after any required number of pulses from 1 to 31. Thus the output of the divider circuit can be programmed to provide division from 1 to 31.

Figure 5:
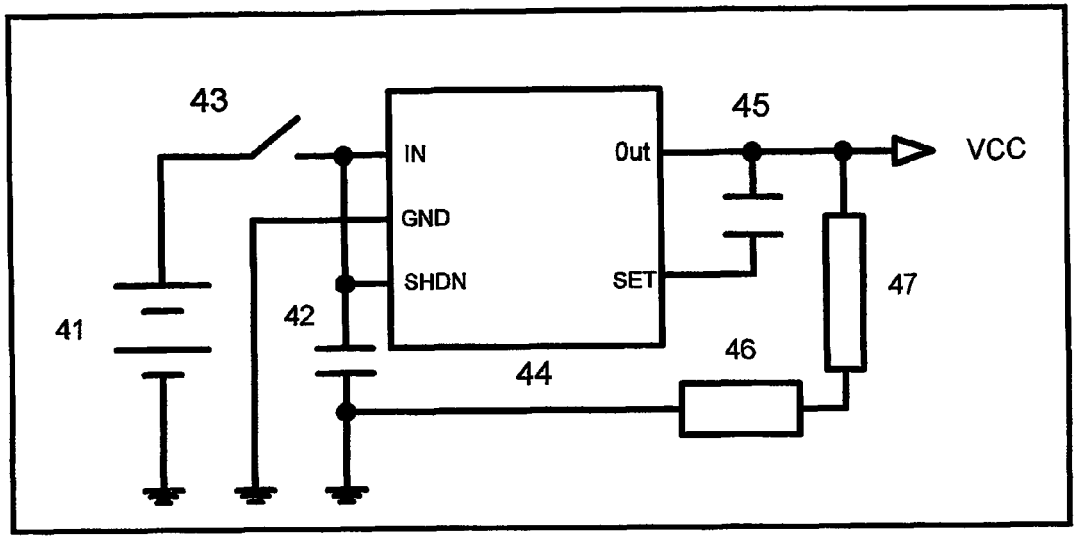
FIG. 5: Low drop-out voltage regulator circuit of the dosemeter described in FIG. 1

FIG. 5: Low drop-out Voltage Regulator Circuit of the Dosemeter Described in FIG. 1

FIG. 5 is the low drop-out voltage regulator circuit. The circuit comprises of capacitors 42 & 45, resistors 46 & 47 and integrated circuit 44 Max 8864. The 6V input from the Lithium battery 41 is regulated to 4V (VCC) at the output of the regulator 43 is the on-off switch used to switch the unit on and off. The output voltage VCC remains at 4V till the battery voltage drains to 4.1V.

Figure 6:
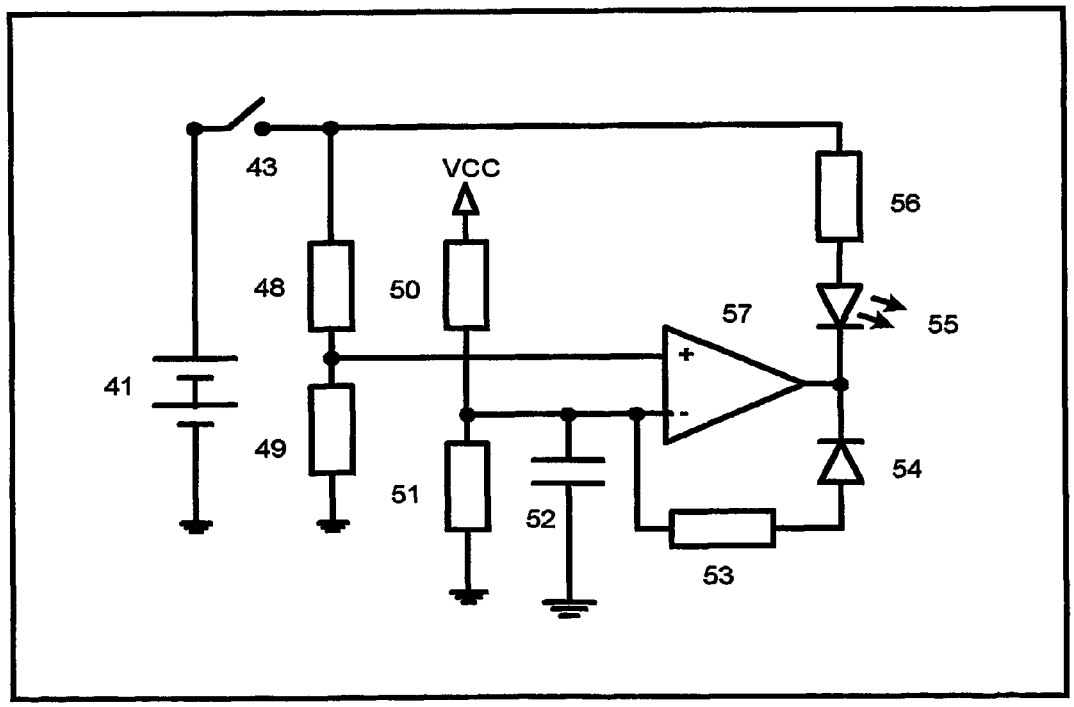
FIG. 6: Battery low warning circuit for the dosemeter described in FIG. 1

FIG. 6: Battery Low Warning Circuit for the Dosemeter Described in FIG. 1

This is the battery low indicator circuit. It comprises of a low power comparator 57 (Max 972), resistors 48, 49, 50, 51, 53 & 56, diode 54, capacitor 52 and LED 55. A fixed threshold voltage derived from the regulated voltage VCC through resistors 50 & 51 is applied to the positive input of the comparator 57. A sample of the battery voltage derived through resistors 48 & 49 is applied to the negative input of the comparator. Normally battery voltage sample is higher than the threshold voltage of the comparator and hence the output of the comparator remains high. The LED 55 remains off. When battery voltage goes below the threshold voltage, the output of the comparator goes low and the LED goes on. Now the capacitor 52 is discharged through resistor 53, diode 54 & the output of the comparator. The voltage at the junction of resistors 50 & 51 is reduced below the threshold voltage and hence the comparator output goes high. The LED goes off. The diode 54 is now reverse biased and the discharge stops. The capacitor gets charged through resistor 50 to the original level and the LED goes on. This cycle repeats and the LED flashes. The frequency of flashing is adjusted in such a way that, with about 8 hours of battery life remaining, the flashing rate is one flash per 3 seconds and at the end of life of the battery the flashing rate 2–3 flashes per second. Thus the flashing LED method of battery low indication, apart from indicating the state of the battery through the rate of flashing, results in a significant reduction in the current drain from the battery during the initial warning phase of the indication.

Advantages of the Invention:

A low cost radiation dose meter of the present invention is based on a silicon semiconductor diode detector has been developed. It has low power consumption leading to over 500 hours of operation without the need for changing the battery. Compared to the prior art quartz fibre electrometer based ion chamber pocket dosemeter, the present invention is more rugged, accurate and has easily readable digital display. Unlike the prior art GM counter detector based pocket dosemeters, the present invention is light in weight and is easy to carry in a shirt pocket. It is much lower in cost due to the use of readily available, off-the-shelf electronic components, than similar commercially available dosemeters which are based on a specially fabricated semiconductor detectors and Application Specific Integrated Circuits (ASICs).

The invention claimed is:

1. A digital pocket dosemeter for measurement of radiation dose from ionising X and Gamma radiation of energy greater than 60KeV comprising:
   i) detector means of the ionizing radiation comprising silicon p-n junction voltage rectifier diode with peak inverse voltage greater than 800V having sensitivity to X or Gamma radiation in the energy range 60 KeV to 1.25 MeV within ±15%;
   ii) CMOS charge sensitive pulse amplifier based on a CMOS inverter for amplifying said electrical impulses at low voltage and power consumption less than 0.4 mW;
   iii) means to reject unwanted electrical noise impulses from said electrical impulses;
   iv) means to achieve a calibration of one impulse per $\mu$Sv;
   v) a discriminator threshold modulation circuit operatively connected to the said detector to achieve an uniform response for X and Gamma rays in the energy range of 60 KeV to 1.25 MeV within ±15%;
   vi) means to achieve linear response up to a dose rate 5 Sv/h
   vii) means to count said unrejected impulses;
   viii) means to display said count cumulatively; and
   ix) a compact battery power source.

2. A digital pocket dosemeter as claimed in claim 1 comprising a single printed circuit board housing operating circuitry with means for mounting surface mount components.

3. A digital pocket dosemeter as claimed in claim 1 wherein the said power source comprise a pair of 6V lithium battery having means to indicate the status of batteries.

4. A digital pocket dosemeter as claimed in claim 3 wherein means to show status of batteries comprise means for changing frequency of blinking of a LED.

5. A digital pocket dosemeter as claimed in claim 1 wherein said operating circuitry and components are housed in a pocket size tubular/cylindrical housing.

6. A digital pocket dosemeter as claimed in claim 1 wherein means to reject unwanted electrical noise impulses from said electrical impulses comprise a single, low power discriminator electronic circuit that response to electrical voltage pulses of amplitude greater than a set threshold voltage and shapes these pulses into pulses of constant amplitude at the output.

7. A digital pocket dosemeter as claimed in claim 1 wherein means for achieving a calibration of one impulses for $\mu$Sv is a programmable divider circuit using binary divider to divide the pulses from the output of said discriminator.

8. A digital pocket dosemeter as claimed in claim 1 wherein means for achieving linearity of response better than ±20% up to 5 Sv/h comprise a fast response amplifier.

9. A digital pocket dosemeter as claimed in claim 1 wherein means for counting said unrejected impulses comprise an electronic radiation dose counter module to store and indicate up to 999999 µSv of integral radiation dose.

10. A digital pocket dosemeter as claimed in claim 1 adapted for operation at a stable low reverse bias of 4±0.2 V.

11. A digital pocket dosemeter as claimed in claim 1 comprising an energy compensation filter along with said discriminator modulation circuit.

12. A digital pocket dosemeter as claimed in claim 1 comprising a low dropout voltage regulator adapted to maintain constant operating voltage of said impulse amplifier as long as the battery voltage is at least 50 mV above the operating voltage.

13. A digital pocket dosemeter as claimed in claim 1 comprising means for maintaining the required operating voltage of said impulse amplifier a an optimized gain for maximum sensitivity for said radiation.

* * * * *